United States Patent [19]
Cook et al.

[11] Patent Number: 5,401,001
[45] Date of Patent: Mar. 28, 1995

[54] INTERNAL COMBUSTION ENGINE EXHAUST CONTROL VALVE

[75] Inventors: John E. Cook; Gary M. Everingham, both of Chatham, Canada; David J. Hazen, Ann Arbor; Gordon W. Sweetnam, Milford, both of Mich.; William C. Gillier, Chatham, Canada

[73] Assignees: Siemens Automotive Ltd., Chatham, Canada; Ford Motor Company, Dearborn, Mich.

[21] Appl. No.: 93,830

[22] Filed: Jul. 19, 1993

Related U.S. Application Data

[63] Continuation-in-part of Ser. No. 896,241, Jun. 10, 1992, abandoned.

[51] Int. Cl.$^6$ .......................... F16K 1/22; F16K 31/44
[52] U.S. Cl. ...................................... 251/308; 60/288; 251/335.5
[58] Field of Search ................... 60/288; 123/323, 337; 251/308, 335.3

[56] References Cited

U.S. PATENT DOCUMENTS

| | | | |
|---|---|---|---|
| 3,782,685 | 1/1974 | Gallagher | 251/335.3 |
| 4,380,246 | 4/1983 | Casale | 251/308 |
| 4,546,662 | 10/1985 | Tremblay | 251/335.3 |

FOREIGN PATENT DOCUMENTS 93183  4/1990  Japan ................................ 251/335.3

Primary Examiner—Douglas Hart
Attorney, Agent, or Firm—George L. Boller; Russel C. Wells; Jerome R. Drouillard

[57] ABSTRACT

The valve shaft passes through a journal bearing in the wall of the valve body to an actuating lever attached to the shaft on the outside of the valve body. This journal bearing is sealed by an arrangement of several parts to prevent escape of exhaust gases. These parts include a bellows and ceramic thrust washers. By making the valve shaft axis non-perpendicularly intersecting the axis of the valve body wall, the entire circumference of the valve blade can be sealed to the valve body wall when the valve is closed.

16 Claims, 4 Drawing Sheets

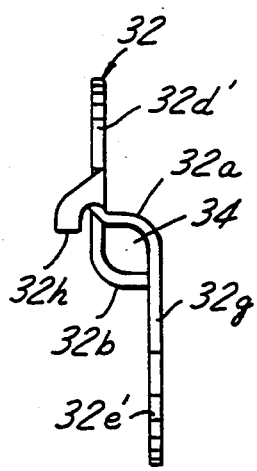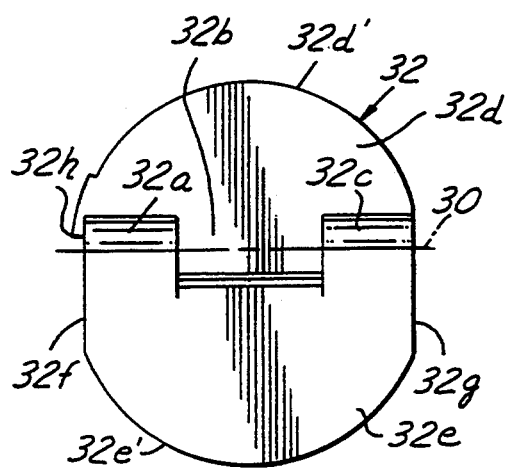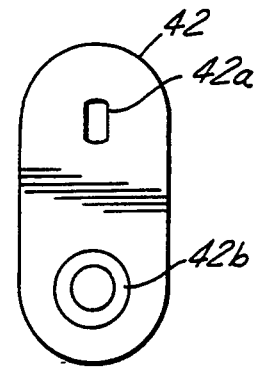
FIG.3　　　　FIG.4　　　　FIG.5
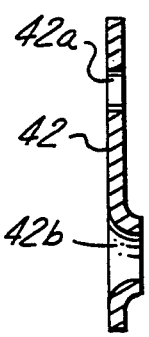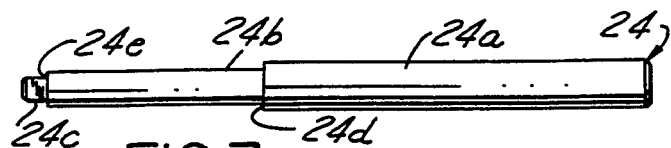
FIG.6　　　FIG.7
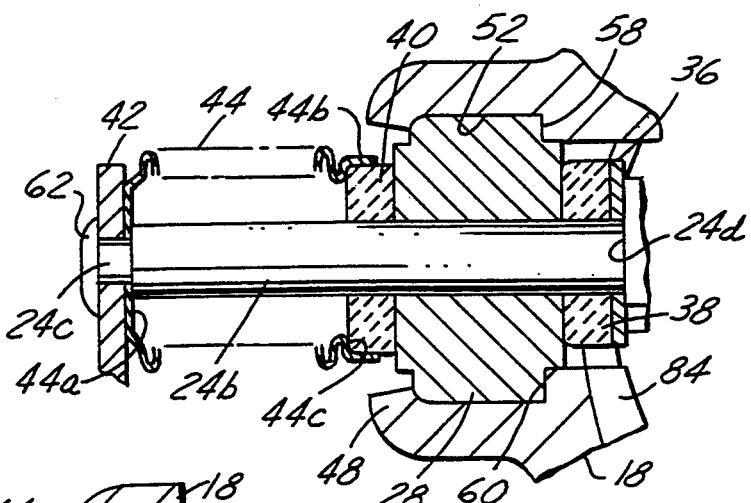
FIG.8
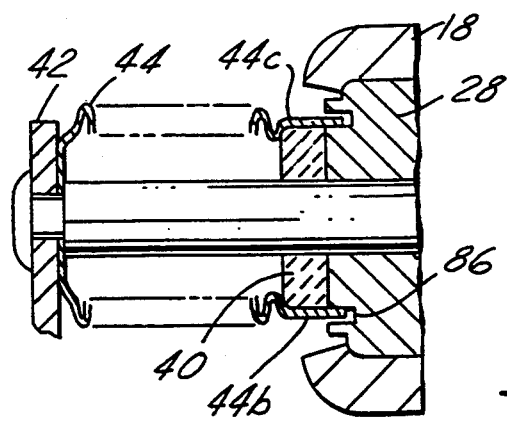
FIG.9

INTERNAL COMBUSTION ENGINE EXHAUST CONTROL VALVE

REFERENCE TO A RELATED APPLICATION

This application is a continuation-in-part of application Ser. No. 07/896,241, filed Jun. 10, 1992, now abandoned.

FIELD OF THE INVENTION

This invention relates generally to exhaust systems of internal combustion engines, and particularly to an exhaust control valve for selectively controlling the exhaust gas flow, such as by diverting the exhaust gases for a limited period of time after cold engine starting so that they are caused to flow through a close-coupled catalyst before entering the main catalytic converter, thereby hastening the catalytic treatment of the exhaust gases at cold engine starting.

BACKGROUND AND SUMMARY OF THE INVENTION

The exhaust systems of today's automotive vehicles that are powered by internal combustion engines are typically equipped with catalytic converter systems. For maximum effectiveness, such catalytic converter systems must be heated to certain elevated temperatures. Since such heating typically comes from exhaust gases that pass through the catalytic converter, there exists an inherent time lag in the catalytic converter reaching maximum effectiveness upon cold engine starting.

In order to accelerate the effectiveness of the catalytic converter system at cold engine starting, it has been proposed to employ a close-coupled catalyst through which the exhaust gases are initially passed until the main catalytic converter has warmed up. A typical configuration comprises the parallel combination of a close-coupled catalyst and an exhaust control valve between the engine exhaust manifold and the inlet of the main catalytic converter. The exhaust control valve is normally open, but is remotely operated closed at engine starting to cause the exhaust flow to pass through the close-coupled catalyst before it enters the main catalytic converter. Since the close-coupled catalyst is capable of becoming effective sooner than the main catalytic converter, the catalytic converter system is rendered capable of becoming effective sooner than if equipped with only the main catalytic converter. Once the main catalytic converter has been heated sufficiently to attain proper effectiveness, the exhaust control valve is remotely operated to revert to its normally open condition. The exhaust gas flow takes the now-favored least restrictive path through the exhaust control valve directly to the main catalytic converter, rather than passing through the close-coupled catalyst before entering the main catalytic converter.

The exhaust control valve is exposed to a rather harsh environment, both thermally and chemically. Moreover, reliability requirements for the exhaust control valve are becoming more stringent. Accordingly, there is a need for improvement in the exhaust control valve that will enable automotive vehicle manufacturers to meet these more stringent requirements in a reasonably cost-effective manner. It is toward a solution for this need that the present invention is directed.

While the inventive features will be described and claimed with greater particularity hereinafter, it may be generally said that the invention relates to an improvement in the manner of sealing the journaling of the valve shaft on a wall of the valve body so as to prevent the escape of exhaust gases through the journal bearing that is mounted in the valve body wall and that journals a portion of the shaft that is between an interior portion of the shaft to which a valve blade is attached and an exterior portion of the shaft to which an actuating mechanism is attached, while still assuring reliable operation of the valve over its expected life. Still speaking somewhat generally, the invention comprises a novel association of a metal bellows with other metallic and non-metallic parts. The non-metallic parts are ceramic thrust washers. One embodiment of the invention provides for improved sealing of the valve blade to the wall of the valve body when the valve is closed by having the shaft axis non-perpendicularly intersecting the axis of the valve body wall, and the entire circumference of the valve blade provided with a circular ring seal. So that the detailed description of a presently preferred embodiment of the invention may now proceed, it is appropriate to briefly describe the accompanying drawings to which the description will make reference. These drawings illustrate the best mode presently contemplated for carrying out the invention.

BRIEF DESCRIPTION OF THE DRAWINGS

FIG. 3 is side view of a blade of the valve by itself, as viewed from a right side elevation of FIG. 2.

FIG. 4 is a view in the direction of arrows 4—4 in FIG. 3.

FIG. 5 is an enlarged view in the direction of arrows 5—5 in FIG. 2 of an actuating lever for the valve by itself.

FIG. 6 is a cross-sectional view in the direction of arrows 6—6 in FIG. 5.

FIG. 7 is a longitudinal view of a shaft for the valve.

FIG. 8 is an enlarged view of a portion of FIG. 2, with additional cross-sectioning.

FIG. 9 is a view similar to FIG. 8 showing a modified form.

DESCRIPTION OF THE PREFERRED EMBODIMENT

Figure 1:
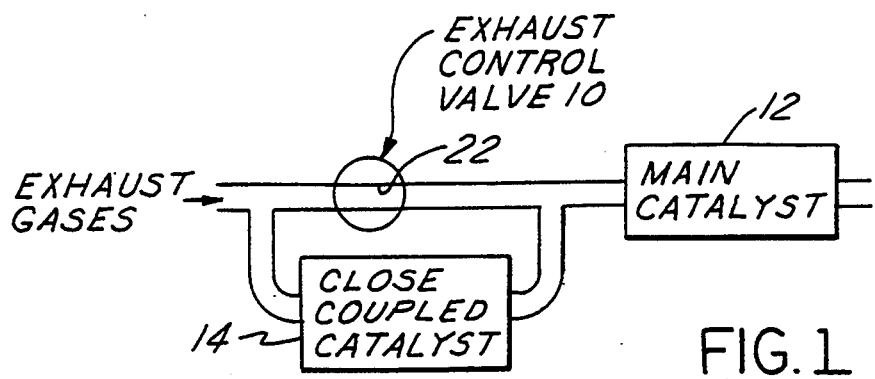
FIG. 1 is a schematic diagram of a portion of an exhaust system of an internal combustion engine which includes an exhaust control valve of the present invention.
Figure 2:
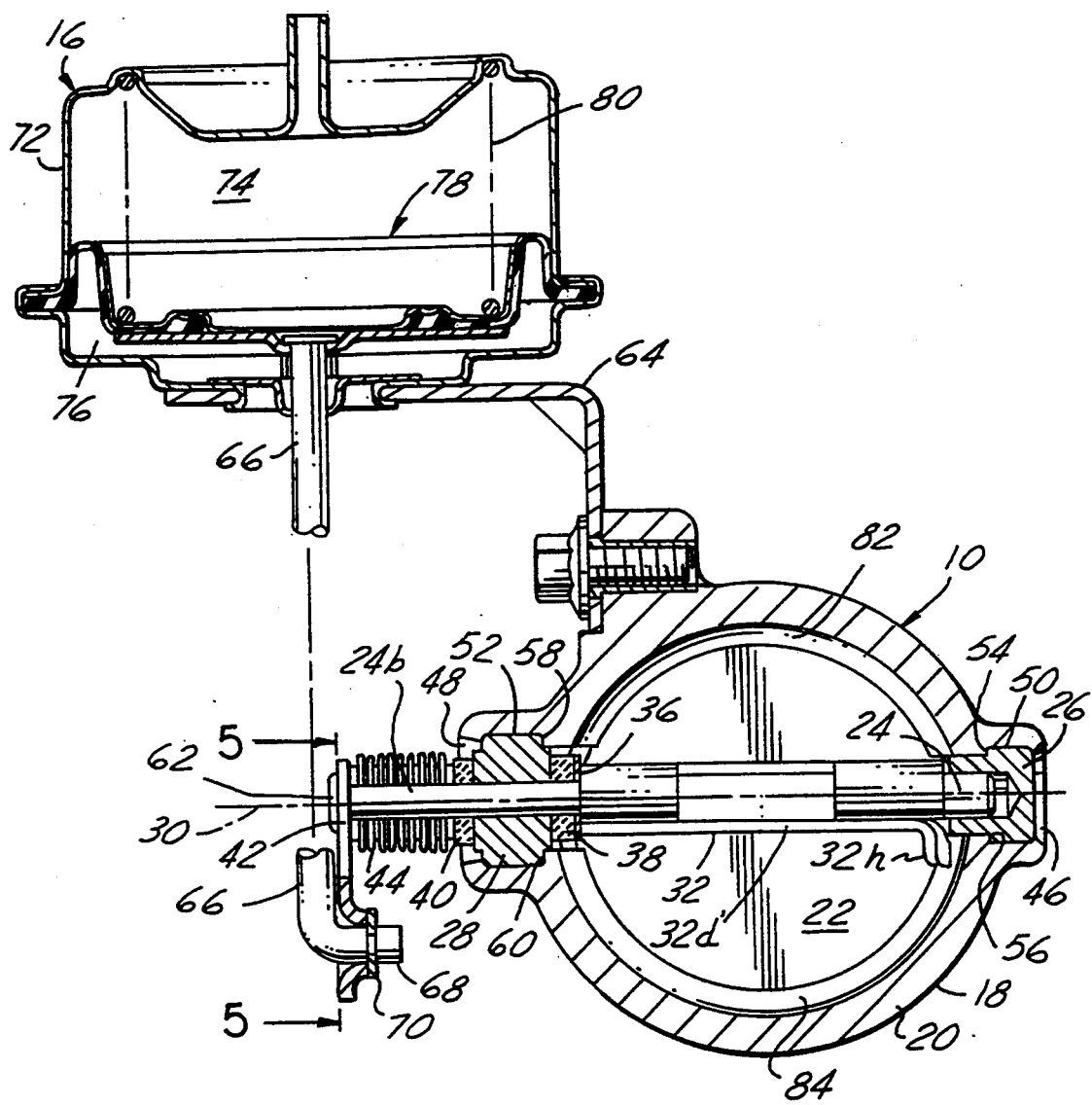
FIG. 2 is transverse cross sectional view through the exhaust control valve, including an actuator for the valve.

FIG. 1 shows an example of a typical exhaust system employing a valve 10 embodying principles of the invention, a main catalyst 12, and a close-coupled catalyst 14. FIG. 1 shows valve 10 in its normally open condition that allows engine exhaust gases to pass directly to main catalyst 12, rather than passing through close-coupled catalyst 14. When valve 10 is operated closed, it blocks the direct communication of the entrance of main catalyst 12 with the engine exhaust manifold so that as a result the exhaust is forced to flow through close-coupled catalyst 14 before entering main catalyst 12. The opening and closing of valve 10 is remotely controlled by a control system having inputs sensing certain conditions relating to engine operation and an output that operates the valve via an actuator mounted adjacent the valve. FIG. 2 illustrates such an actuator 16, and FIGS. 2-8 disclose details of valve 10.

Valve 10 comprises a body 18 having a cylindrical wall 20 bounding an exhaust flow path 22 through body 18 between a valve inlet and a valve outlet. Transversely diametrically spanning flow path 22 is a cylindrical shaft 24, that is shown by itself in FIG. 7 prior to its assembly to other parts of the valve. Shaft 24 has three different diameter portions, 24a, 24b, 24c, that become successively smaller from right to left in FIG. 7 so as to define two shoulders 24d, and 24e, as shown. Shaft portion 24a is circular in cross section, and its far right end serves to journal that end of the shaft on wall 20 via a journal bearing 26. Shaft portion 24b is circular in cross section and has an intermediate section journaled on wall 20 via a journal bearing 28 diametrically opposite bearing 26 about flow path 22. The journaling of shaft 24 on body 18 via these two bearings provides for the shaft to execute rotary motion about an axis 30 that is coincident with the shaft's own axis.

A blade 32, that is shown by itself in FIGS. 3 and 4, is disposed on shaft portion 24a within flow path 22. A central region of blade 32 is shaped into three distinct portions 32a, 32b, and 32c which define a circular aperture 34 into which shaft portion 24a is pressed. Portions 32a, 32c define a certain arcuate extent of the aperture about axis 30, while portion 32b defines an opposite arcuate extent. Thus blade 32 has two opposite halves 32d, 32e that are non-co-planar. They are also asymmetrical. Each blade half 32d, 32e has a corresponding arcuate edge 32d', 32e' that is slightly less than a semicircle. These edges 32d', 32e' are joined by respective edges 32f, 32g that span portions 32a, 32c respectively and occupy mutually parallel planes which are perpendicular to axis 30. Proximate edge 32f, edge 32d' is provided with a stop tang 32h. Blade 32 is united for rotation with shaft 24 by any suitable means of joining, such as by welding the blade to the shaft.

Disposed on shaft 24 between blade 32 and bearing 28 are two washers 36, 38. A third washer 40 is disposed on shaft 24 on the opposite axial face of bearing 28 from washers 36, 38. An actuating lever, or crank, 42, that is shown by itself in FIGS. 5 and 6, is disposed on shaft portion 24c and secured to that end of the shaft. A bellows 44 is disposed over shaft portion 24b and extends between lever 42 and washer 40.

Body 18 is metal, such as a nodular iron, which possess a certain degree of ductility. This allows bearings 26, 28 to be crimped in place on body 18 by respective crimps 46, 48 after they have been disposed in respective mounting holes 50, 52 that extend through bosses in diametrically opposites sides of wall 20 between the interior and exterior of body 18. Prior to mounting of bearing 26 in its hole 50, crimp 46 has not yet been formed. This allows bearing 26 to be pressed into hole 50 from the outside of body 18 until a shoulder 54 that extends around the outside of the bearing abuts a shoulder 56 of hole 50. Then the exterior of the boss is deformed against the bearing to create the crimp. This mounting of bearing 26 in wall 20 creates a surface to surface sealing of the bearing to the wall, and since the bearing contains a blind journal hole for receiving the end of shaft 24, exhaust gases cannot leak from the valve's interior via this bearing.

The other journal also sealed against escape of exhaust gases even though lever 42 is disposed on the exterior of the valve for connection to actuator 16. Bearing 28 is installed in hole 52 in like manner to the installation of bearing 26 just described, bearing 28 and hole 52 having respective abutting shoulders 58 of bore 28, 60 of body 18; however, as will become more apparent from ensuing description, bearing 28 is pre-assembled onto shaft 24 along with parts 36, 38, 40, 42, and 44 before it is inserted into hole 52 and crimped in place. Accordingly in the completed valve, there is surface to surface sealing of bearing 28 to wall 20 against escape of exhaust gases past the bearing's O.D. Unlike bearing 26 however, bearing 28 does not have a blind hole, but rather a through-hole through which shaft portion 24b extends. Thus, it is necessary to prevent escape of exhaust gases via the running clearance between the shaft O.D. and the bearing I.D. This is accomplished as follows.

Washer 36 is a metal washer that is assembled onto shaft portion 24b to abut shoulder 24d. Washer 38 is a ceramic thrust washer, aluminum oxide for example, that is assembled onto shaft portion 24b so as to space washer 36 from bearing 28. Washer 40 is a ceramic thrust washer, aluminum oxide for example, that is assembled onto shaft portion 24b for disposition against the outer face of bearing 28. Bellows 44 is assembled onto shaft portion 24b and finally lever 42 is assembled onto shaft portion 24c and abutted with a proximate radial end wall 44a of bellows 44 to sandwich that end wall between itself and shoulder 24e. End wall 44a has a hole through which shaft 24 passes thus centering this axial end of the bellows with respect to axis 30. The free end of shaft portion 24c is then deformed to create a head 62 that keeps the lever sandwiching bellows end wall 44a between itself and shoulder 24e. The opposite axial end of bellows 44 has an open circular axial wall 44b that is adjoined interiorly by a circular radial wall 44c. Wall 44b closely overlaps the O.D. of washer 40 to thereby center this end of the bellows on the washer and hence with axis 30. In the finished valve, bellows 44 is resiliently compressed between lever 42 and washer 40. This is because the difference between the sum of the axial dimensions of parts 36, 38, 28, and 40 along shaft 24 and the distance between shoulders 24d, 24e is less than the free uncompressed length of bellows 44.

Since lever 42 and washer 36 are disposed at defined locations along shaft 24 by virtue of their respective abutments with shoulders 24e, 24d, the resilient axial compression of bellows 44 creates a bias force that continually urges wall 44c into surface to surface sealing contact with the radially outer margin of the outer face of washer 40, and in turn the interior face of washer 40 into surface to surface sealing with the outer face of bearing 28, while simultaneously urging shoulder 24d against the inner face of washer 36, and in turn the outer face of washer 36 into surface to surface sealing with the inner face of washer 38, and in turn the outer face of washer 38 into surface to surface sealing with the inner face of bearing 28.

FIG. 5 shows that lever 42 has a non-circular hole 42a via which it is fitted onto shaft portion 24c. Accordingly, it should be understood that shaft portion 24c has a similar initial shape that allows the lever to be assembled onto it prior to creation of head 62. Lever 42 also has a pierced circular hole 42b in spaced relation to hole 42a. Hole 42b provides for the operative connection of the movement of actuator 16 to the lever.

The body of actuator 16 is mounted to the exterior of valve body 18 by a bracket 64, as shown in FIG. 2. The actuator's movement comprises a rod 66 that is mainly straight, but whose distal end 68 is bent at a right angle to pass through hole 42b of lever 42. A keeper 70 such as a retaining ring is assembled onto end 68 as shown to keep it from coming out of hole 42b.

Actuator 16 is a conventional vacuum-actuated device. It has a housing 72 that is divided into two chambers, a vacuum chamber 74 and an atmospheric chamber 76, by a diaphragm 78. A spring 80 biases diaphragm 78 toward atmospheric chamber 76. When no vacuum is communicated to vacuum chamber 74 so that the vacuum chamber is at atmosphere, the actuator assumes the position of FIG. 2, corresponding to valve 10 being open as portrayed by FIG. 2. When vacuum is introduced into the vacuum chamber, the greater pressure in the atmospheric chamber pushes diaphragm 78 toward vacuum chamber 74 against the force of spring 80. Actuator rod 66 retracts into actuator housing 72 rotating lever 42, and hence shaft 24, in the process. Consequently, valve 10 is operated closed. The interior of wall 20 has arcuate ledges 82, 84 against which the arcuate edges of the blade close. When the vacuum in the vacuum chamber disappears, actuator rod 66 extends, rotating lever 42 and shaft 24 in the direction of opening the valve. The full open position is defined by the abutment of stop tang 32h with ledge 84.

FIG. 9 shows a modification wherein a circular annular groove 86 is provided in the outer axial face of bearing 28 and axial wall 44b full overlaps washer 40 and extends into groove 86. The walls of groove 86 should provide a running clearance for wall 44b, but is preferably dimensioned to provide a labyrinth type seal between the two.

Due to the harsh environment, the selection of materials is important. Bellows 44, washer 38, shaft 24, blade 32 are preferably stainless steel. Journal bearings 26, 28 also are preferably stainless steel. A representative force that is exerted by the compressed bellows is in the 3-4 pound range.

The process for assembling the valve comprises creating a shaft sub-assembly, as described earlier, and while blade 32 is disposed in flow path 22 with its aperture 34 aligned with the blind hole in bearing 26, inserting the shaft sub-assembly through hole 52 until bearing 28 is seated in that hole. During insertion, shaft portion 24a passes through aperture 34. After the insertion, crimp 48 is formed, and blade 32 welded to shaft 24. The actuator rod end 68 is then connected to lever 42.

While a certain amount of precision in the shaft and its associated parts is necessary in order to achieve the best possible sealing, sealing of the blade to the flow path wall when the valve is closed may not require the same level of precision; in other words, some leakage through the valve may be acceptable in certain uses of the valve. Moreover, the valve may be used in exhaust system configurations other than the one specifically illustrated herein. While a presently preferred embodiment of the invention has been illustrated and described, it should be appreciated that principles are applicable to other embodiments that fall within the scope of the following claims.

Figure 10:
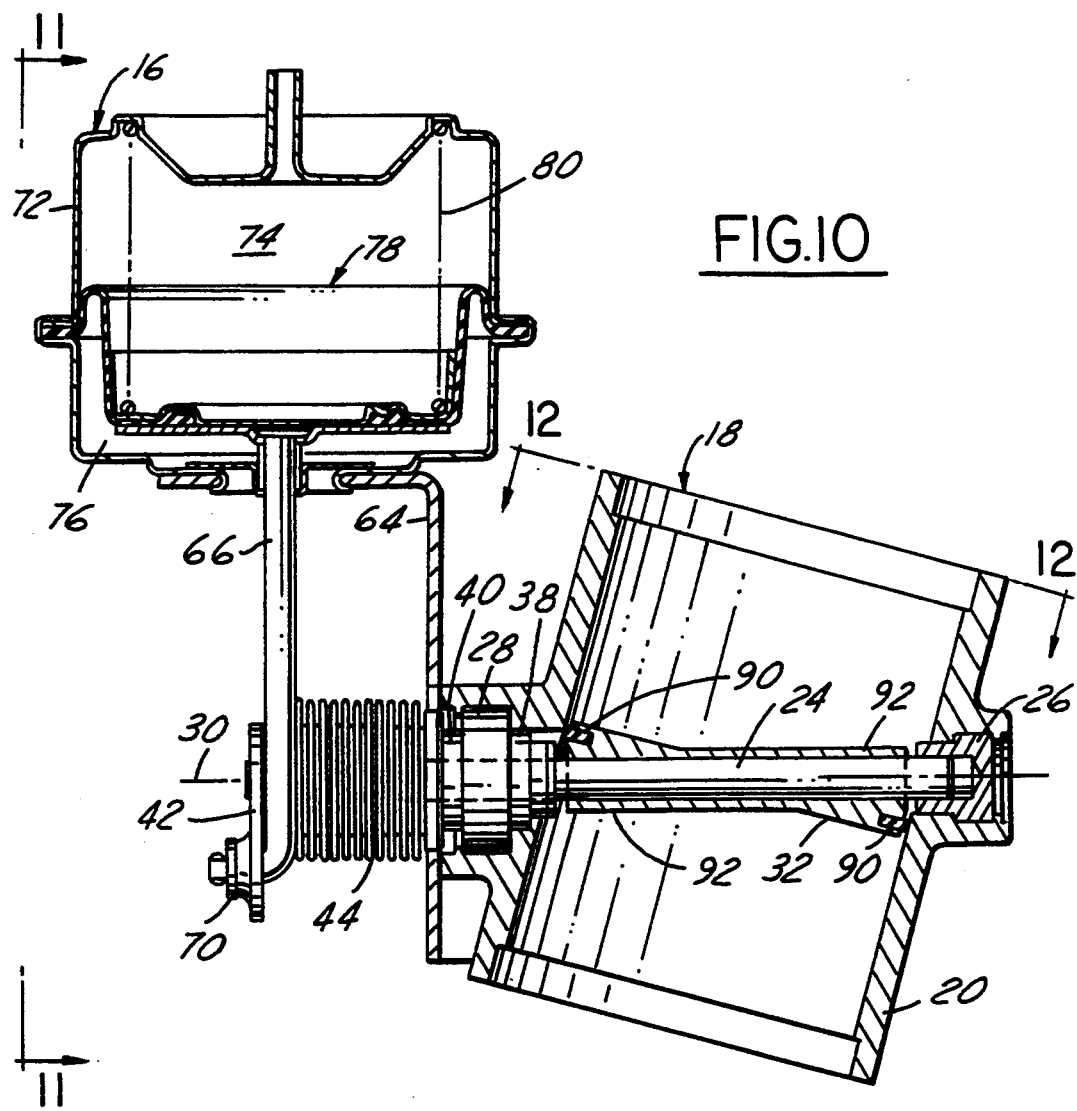
FIG. 10 is a view similar to FIG. 2 showing another embodiment of exhaust control valve.
Figure 12:
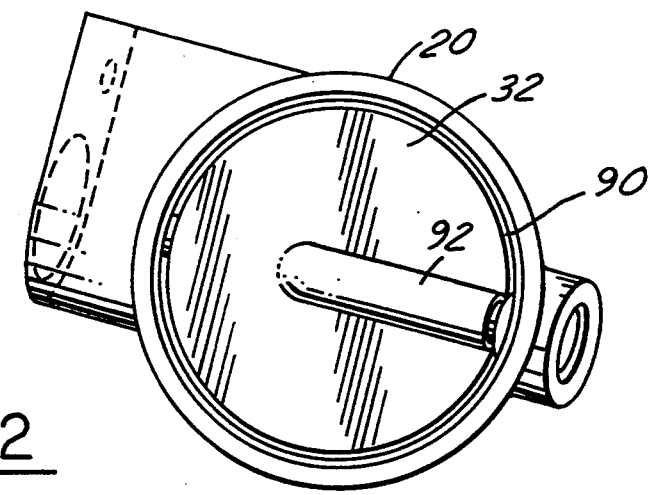
FIG. 12 is a view in the direction of arrows 12—12 in FIG. 11 with certain portions having been removed for illustrative purposes.
Figure 11:
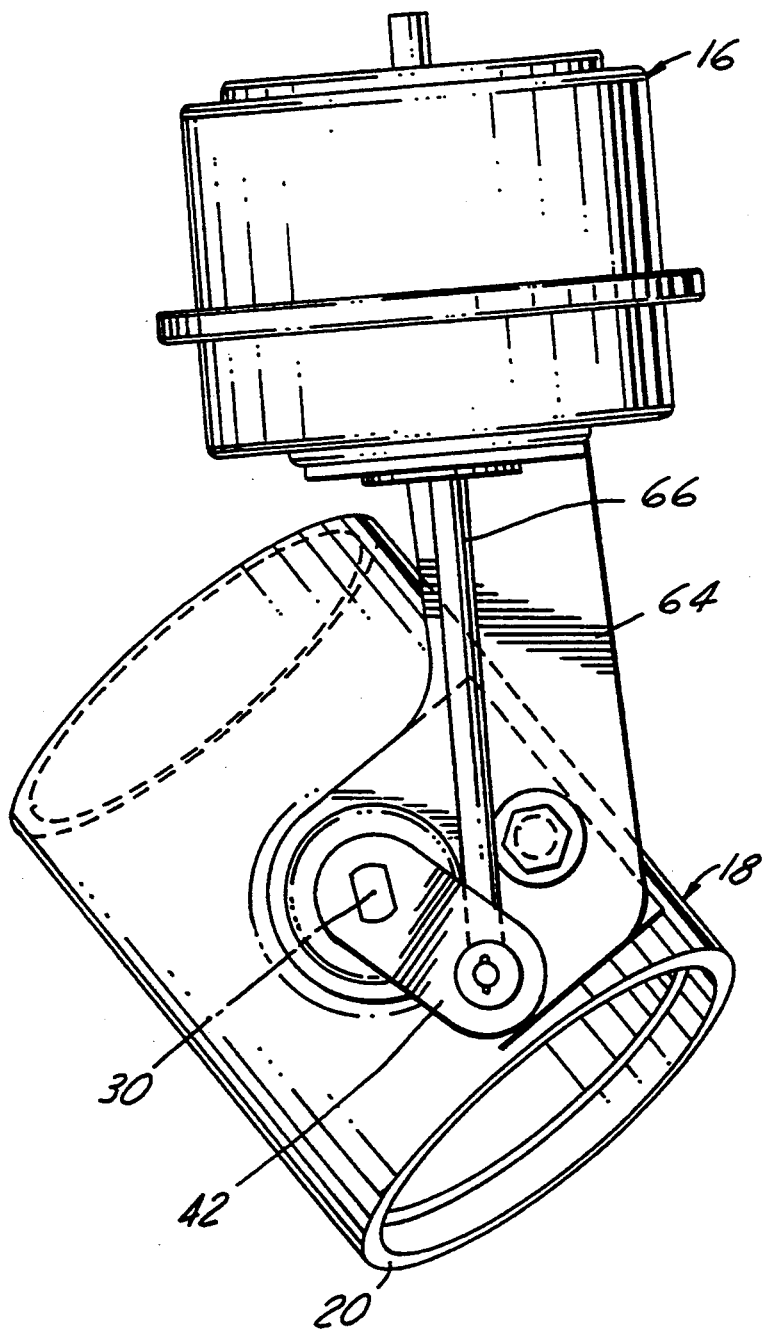
FIG. 11 is a view looking generally in the direction of arrows 11—11 in FIG. 10.

FIGS. 10, 11, and 12 disclose an embodiment that contains all the features of FIG. 2, similarly numbered, but differing in that shaft 24 is non-perpendicular to the axis of the circular wall 20 even though the shaft axis 30 still intersects the wall's axis. The mounting of actuator 16 on valve body 18 is modified so that rod 66 continues to act on lever 42 generally in a plane that is perpendicular to axis 30. Blade 32 is now fully circular and generally planar and comprises a ring seal 90 around its full circumference that is effective to seal the full circumference of the blade to wall 20 when the valve is closed. An integral sleeve 92 passes through the generally planar blade from one face to the other. Shaft 24 passes through the sleeve, coupling the blade and shaft for rotary motion in unison while also closing the sleeve so that exhaust cannot pass through the sleeve from one face of the blade to the other. This embodiment will provide improved sealing of the blade to the body when the valve is closed, and consequently less leakage through the closed valve.

What is claimed is:

1. In an internal combustion engine exhaust system having a remotely operated exhaust control valve for selectively controlling the flow of exhaust gas wherein the valve comprises a valve body having an inlet and an outlet and containing between said inlet and said outlet a valve means that is journaled for rotary motion on said body by means of a shaft that extends through a bearing in a wall of said body between the inside and the outside of said body, said shaft having an outside portion that is coupled to an actuator via which the remote control of said valve is accomplished, the improvement for preventing exhaust gas from escaping the inside of said body via said bearing which comprises: said bearing having surface to surface sealing with a hole in said wall within which said bearing is mounted, said bearing comprising a hole through which said shaft passes, ceramic washers disposed on opposite axial faces of said bearing in surface to surface sealing with said bearing, one of said ceramic washers having such surface to surface sealing with a face of said bearing that is toward the outside of said body, said shaft passing through said ceramic washers, a bellows disposed on said shaft and having opposite axial ends, means closing one of said bellows' ends to said shaft, and the other of said bellows ends having surface to surface sealing said one ceramic washer, said bellows being axially compressed so that it exerts forces urging said washers against said bearing and said other bellows' end against said one ceramic washer.

2. The improvement set forth in claim 1 in which said other of said bellows ends fully axially overlaps said one ceramic washer and extends into a groove in the face of said bearing that is toward the outside of said body to form a labyrinth type seal therewith.

3. The improvement set forth in claim 1 in which said means closing one of said bellows' ends to said shaft comprises means axially sandwiching said one bellows' end against a shoulder of said shaft.

4. The improvement set forth in claim 3 in which said means axially sandwiching said one bellows' end against a shoulder of said shaft comprises a head that is formed integrally with said shaft.

5. The improvement set forth in claim 4 in which said actuating lever for rotating said shaft is disposed sandwiched between said head and said one bellows' end.

6. The improvement set forth in claim 1 in which said shaft is arranged with its axis non-perpendicularly intersecting the axis of a circular walled section of a passageway through said body between said inlet and said outlet, said valve means comprises a circular perimeter, and including sealing means for sealing the entire circular perimeter of said valve means to said circular walled section of said passageway when said valve means is operated to close said passageway.

7. The improvement set forth in claim 6 in which said sealing means is mounted on said valve means.

8. The improvement set forth in claim 7 in which said valve means comprises a generally planar circular blade portion that contains said circular perimeter, said sealing means is a ring seal mounted on said circular perimeter, and said valve means comprises a sleeve which is integral with and passes through said blade portion and through which said shaft passes to couple said valve means and said shaft for rotary motion in unison.

9. A remotely operated exhaust control valve for selectively controlling the flow of exhaust gas from an internal combustion engine, wherein the valve comprises a valve body having an inlet and outlet and containing between said inlet and said outlet a valve means that is journaled for rotary motion on said body by means of a shaft that extends through a bearing in a wall of said body between the inside and the outside of said body, said shaft having an outside portion that is coupled to an actuator via which the remote control of said valve is accomplished, characterized by means for preventing exhaust gas from escaping the inside of said body via said bearing which comprises: said bearing having surface to surface sealing with a hole in said wall within which said bearing is mounted, said bearing comprising a hole through which said shaft passes, ceramic washers disposed on opposite axial faces of said bearing in surface to surface sealing with said bearing, one of said ceramic washers having such surface to surface sealing with a face of said bearing that is toward the outside of said body, said shaft passing through said ceramic washers, a bellows disposed on said shaft and having opposite axial ends, means closing one of said bellows' ends to said shaft, and the other of said bellows ends having surface to surface sealing said one ceramic washer, said bellows being axially compressed such that it exerts forces urging said washers against said bearing and said other bellows' end against said one ceramic washer.

10. The exhaust control valve set forth in claim 9 in which said other of said bellows ends fully axially overlaps said one ceramic washer and extends into a groove in the face of said bearing that is toward the outside of said body to form a labyrinth type seal therewith.

11. The exhaust control valve set forth in claim 9 in which said means closing one of said bellows' ends to said shaft comprises means axially sandwiching said one bellows' end against a shoulder of said shaft.

12. The exhaust control valve set forth in claim 11 in which said means axially sandwiching said one bellows' end against a shoulder of said shaft comprises a head that is formed integrally with said shaft.

13. The exhaust control valve set forth in claim 12 in which said actuating lever for rotating said shaft is disposed sandwiched between said head and said one bellows' end.

14. The improvement set forth in claim 9 in which said shaft is arranged with its axis non-perpendicularly intersecting the axis of a circular walled section of a passageway through said body between said inlet and said outlet, said valve means comprises a circular perimeter, and including sealing means for sealing the entire circular perimeter of said valve means to said circular walled section of said passageway when said valve means is operated to close said passageway.

15. The improvement set forth in claim 14 in which said sealing means is mounted on said valve means.

16. The improvement set forth in claim 15 in which said valve means comprises a generally planar circular blade portion that contains said circular perimeter, said sealing means is a ring seal mounted on said circular perimeter, and said valve means comprises a sleeve which is integral with and passes through said blade portion and through which said shaft passes to couple said valve means and said shaft for rotary motion in unison.

* * * * *